(12) United States Patent
Reid

(10) Patent No.: US 7,503,574 B1
(45) Date of Patent: Mar. 17, 2009

(54) BICYCLE CADDIE

(76) Inventor: Todd E. Reid, 1106 McCollough Ct. NW. #301, Washington, DC (US) 20001

(*) Notice: Subject to any disclaimer, the term of this patent is extended or adjusted under 35 U.S.C. 154(b) by 331 days.

(21) Appl. No.: 11/405,108

(22) Filed: Apr. 17, 2006

(51) Int. Cl.
*B62K 27/00* (2006.01)
(52) U.S. Cl. .................. 280/204; 280/414.2
(58) Field of Classification Search .............. 280/204, 280/414.2
See application file for complete search history.

(56) References Cited

U.S. PATENT DOCUMENTS

| | | | | |
|---|---|---|---|---|
| 5,076,600 A | * | 12/1991 | Fake | ................. 280/204 |
| 5,320,371 A | * | 6/1994 | Levad | ................. 280/204 |
| 5,641,173 A | * | 6/1997 | Cobb, Jr. | ................. 280/204 |
| 6,296,297 B1 | * | 10/2001 | Barrow et al. | .............. 296/173 |
| 6,446,981 B1 | * | 9/2002 | Wise et al. | ................. 280/7.17 |
| 6,766,769 B1 | * | 7/2004 | Doyle et al. | ................. 119/496 |
| 2006/0226625 A1 | * | 10/2006 | Balscheit | ................. 280/204 |

* cited by examiner

*Primary Examiner*—Paul N Dickson
*Assistant Examiner*—Marlon A Arce

(57) ABSTRACT

A bicycle caddie is disclosed. An illustrative embodiment of the bicycle caddie includes a portable enclosure having an enclosure opening, a hitch bar provided on the enclosure and a fold-out table provided on the enclosure.

13 Claims, 4 Drawing Sheets

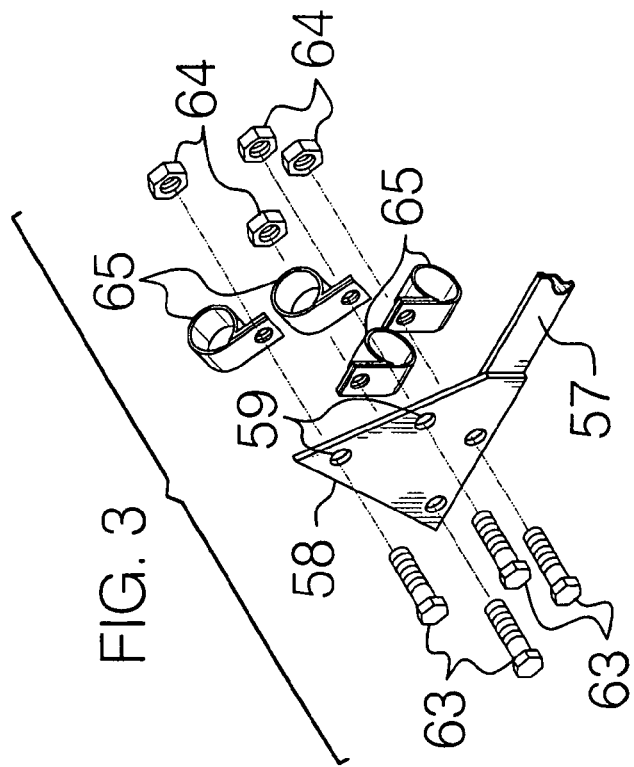
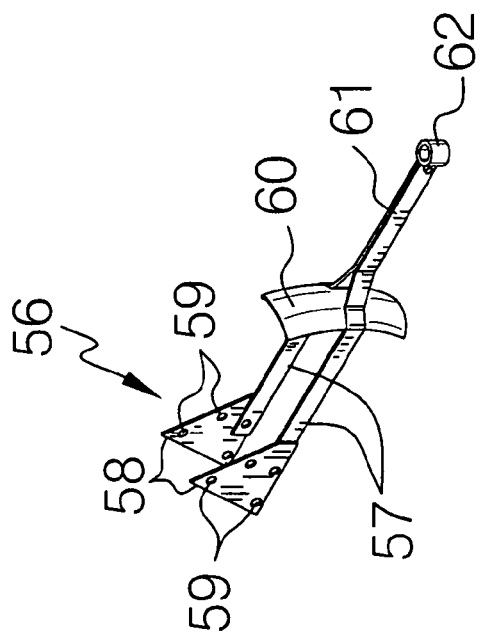
FIG. 2
FIG. 3

BICYCLE CADDIE

FIELD

The present invention relates to bicycles. More particularly, the present invention relates to a bicycle caddie which can be towed behind a bicycle to carry various items.

BACKGROUND

Bicycling has become an increasingly popular pastime through the years. Cyclists frequently ride bicycles to a picnic site for a picnic or tailgating event, for example, to prolong their enjoyment of the outdoors. Various compartments and the like are known for enabling a cyclist to carry such items as food, beverages, sunscreen and the like. However, such compartments are limited in item-carrying capacity and capability.

SUMMARY

The present invention is generally directed to a bicycle caddie. An illustrative embodiment of the bicycle caddie includes a portable enclosure having an enclosure opening, a hitch bar provided on the enclosure and a fold-out table provided on the enclosure.

BRIEF DESCRIPTION OF THE DRAWINGS

The invention will now be described, by way of example, with reference to the accompanying drawings, in which:

FIG. 2 is a perspective view of a towing frame component of an illustrative embodiment of the bicycle caddie;

FIG. 3 is an exploded, perspective view illustrating a typical method of attaching a towing frame to a bicycle frame;

DETAILED DESCRIPTION

Figure 5:
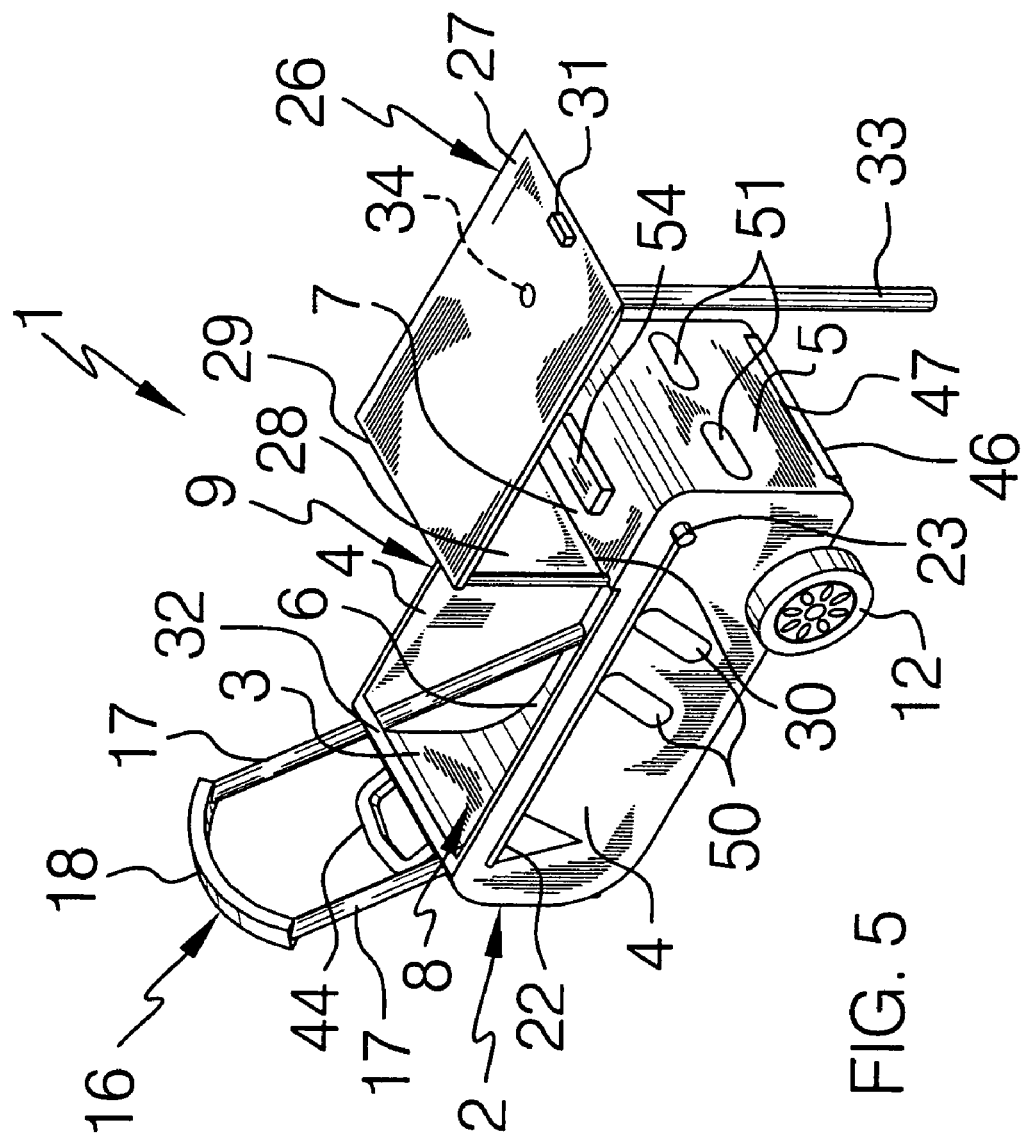
FIG. 5 is a rear perspective view of an illustrative embodiment of the bicycle caddie, with a table component of the caddie deployed in a functional configuration.

Referring to the drawings, an illustrative embodiment of a bicycle caddie according to the present invention is generally indicated by reference numeral 1. The bicycle caddie 1 includes an enclosure 2. The enclosure 2 may include, for example, a front panel 3; a pair of side panels 4 extending from the front panel 3; a rear panel 5 extending between the side panels 4; a bottom panel 6 provided on the front panel 3, the side panels 4 and the rear panel 5; and a top panel 7 extending from the rear panel 5. The enclosure 2 has an enclosure interior 8. As shown in FIG. 5, an enclosure opening 9 is defined between the front panel 3, the side panels 4 and the top panel 7 and communicates with the enclosure interior 8.

Figure 4:
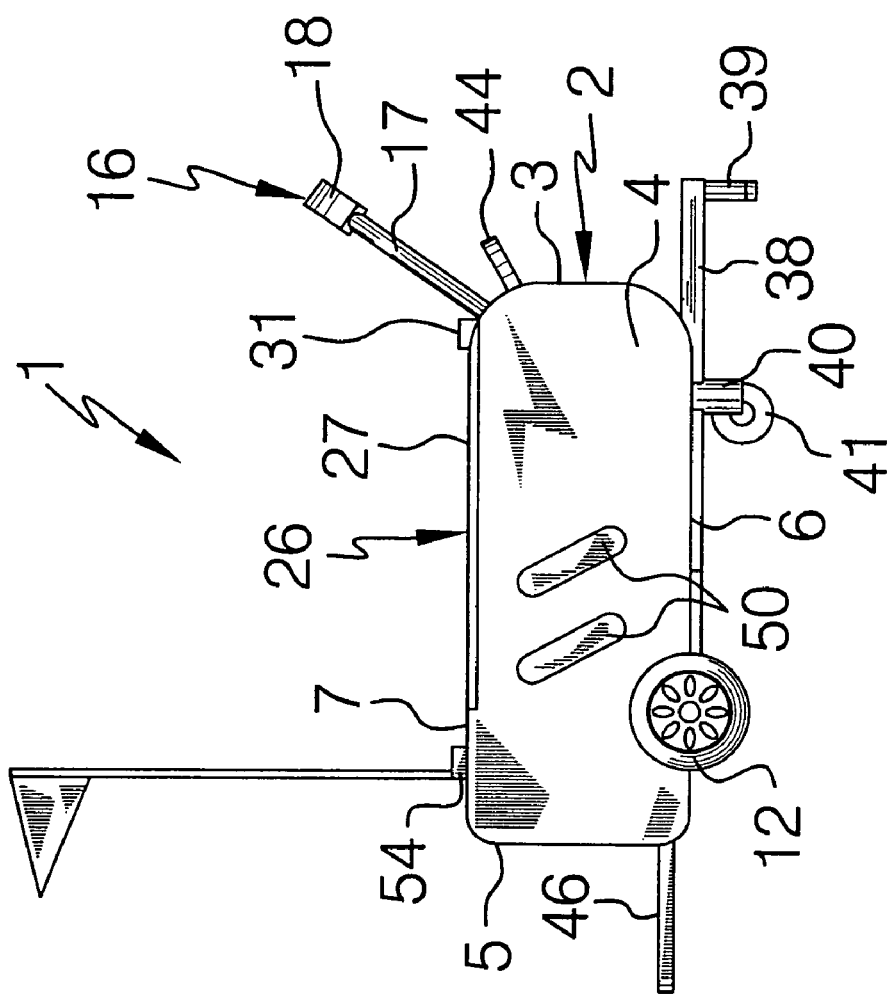
FIG. 4 is a side view of an illustrative embodiment of the bicycle caddie.

The enclosure 2 is rendered portable by a pair of wheels 12. A handle 16 may be provided on the enclosure 2. The handle 16 may include, for example, a pair of handle shafts 17 which are telescopically extendable from shaft openings (not shown) provided in the enclosure 2; and a handle bar 18 which spans the handle shafts 17. Accordingly, the handle 16 may be selectively extended from the enclosure 2 to facilitate pulling the enclosure 2 on the wheels 12 as the wheels 12 roll on a surface (not shown), or retracted into the enclosure 2 when not needed. A hand grip 44 may additionally or alternatively be provided on the enclosure 2. A carrying tray 46 may be selectively extendable from the enclosure 2, such as through a tray slot 47 provided in the rear panel 5, for example, as shown in FIG. 5. As shown in FIG. 4, a swivel wheel 41 may be mounted on a swivel wheel frame 40 provided on the bottom of the enclosure 2. The swivel wheel 41 may be retractable and aids in wheeled transport of the enclosure 2 on the surface (not shown).

Figure 1:
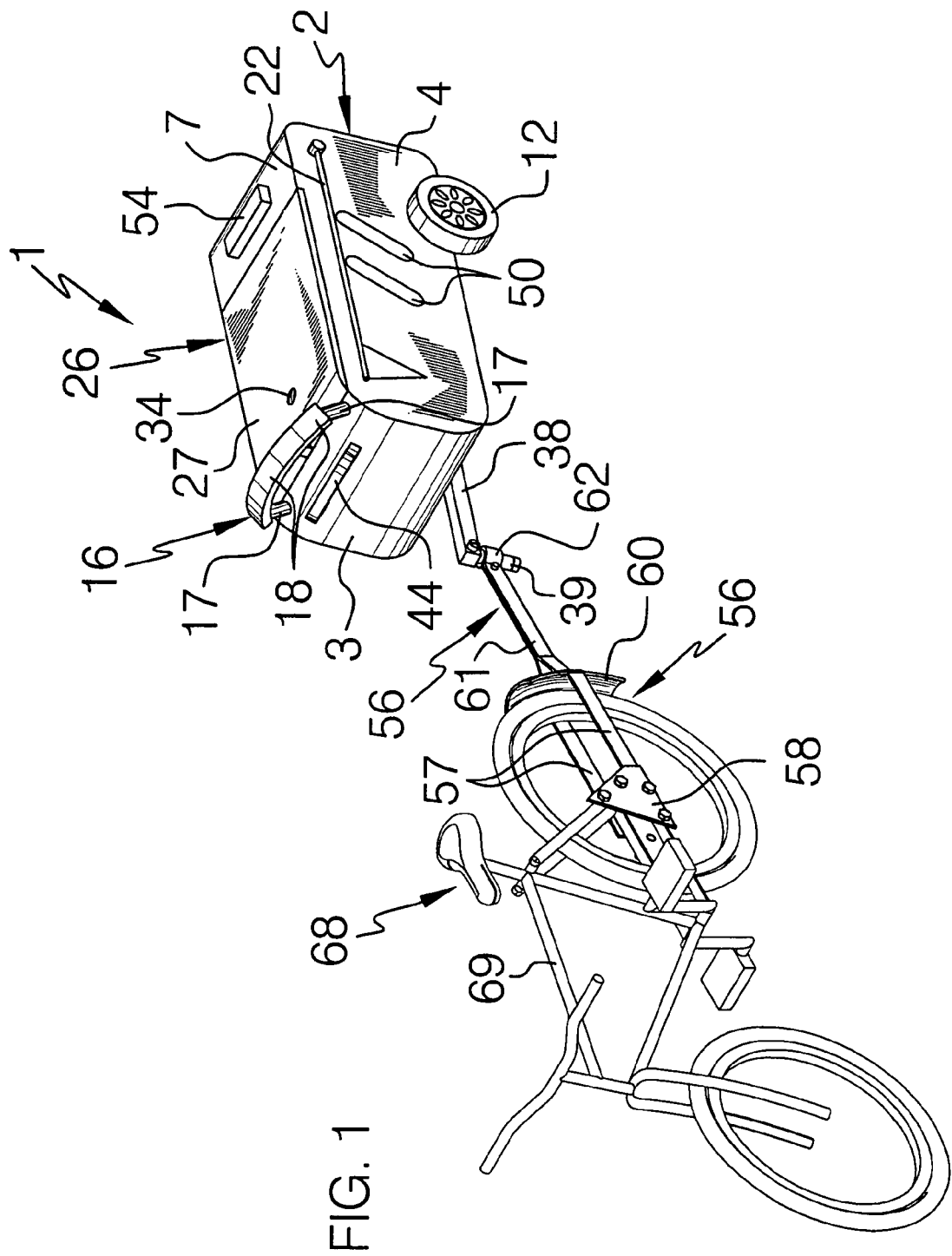
FIG. 1 is a perspective view of an illustrative embodiment of a bicycle caddie, coupled to a bicycle.

A flag 22 may be attached to the enclosure 2. For example, the flag 22 may be pivotally attached to the enclosure 2 at a pivot point 23 in such a manner that the flag 22 can be selectively deployed in an extended, functional position shown in FIG. 4 and a folded, storage or non-functional position shown in FIGS. 1 and 5. One or multiple side reflectors 50 may be provided on each side panel 4, and one or multiple rear reflectors 51 may be provided on the rear panel 5, of the enclosure 2. A safety light 54, which may be battery-powered and/or solar-powered, may be provided on the enclosure 2, such as, for example, on the top panel 7.

The enclosure 2 may be fitted with a fold-out table 26. The fold-out table 26 may include, for example, a table panel 27. A hinge panel 28 is pivotally connected to an edge of the table panel 27 along a panel hinge 29. An opposite edge of the hinge panel 28 is pivotally connected to an edge of the top panel 7 along an enclosure hinge 30. Accordingly, the fold-out table 26 can be selectively deployed in the closed configuration shown in FIGS. 1 and 4, in which the table panel 27 closes the enclosure opening 9 of the enclosure interior 8; and the extended, functional configuration shown in FIG. 5, in which the hinge panel 28 is disposed in a vertical position and supports one end of the table panel 27 above the enclosure 2. A table leg 33 can be detachably connected to the table panel 27 to engage a supporting surface (not shown) and support the opposite end of the table panel 27. The table leg 33 may be detachably connected to the table panel 27 by threaded engagement with a table leg port 34 provided on the table panel 27. A lock 31 may be provided on the table panel 27 to engage a lock ledge 32 provided on the enclosure 2 when the table panel 27 is deployed in the closed configuration, as shown in FIGS. 3 and 4.

A hitch bar 38 extends forwardly from the enclosure 2. A hitch pin 39 is typically provided on the hitch bar 38. In use of the bicycle caddie 1, as will be hereinafter described, the hitch pin 39 is detachably coupled to a towing frame 56 (FIG. 2) provided on a bicycle 68 (FIG. 1) to facilitate towing of the bicycle caddie 1 using the bicycle 68.

As shown in FIGS. 2 and 3, the towing frame 56 typically includes a pair of elongated, parallel, spaced-apart frame arms 57 which extend from a frame shaft 61. A mount bracket 58 is provided on one of the frame arms 57. Multiple fastener openings 59 extend through each mount bracket 58. A fender 60 may be provided between the frame arms 57. A hitch collar 62 is typically provided on the frame shaft 61 and is adapted to receive the hitch pin 39 of the hitch bar 38.

The towing frame 56 is attached to the bicycle frame 69 of the bicycle 68 typically as shown in FIG. 3. Accordingly, multiple frame mount collars 65 are attached to various elements of the bicycle frame 69 using threaded fasteners 63 which are extended through the respective fastener openings 59 in the mount bracket 58. Securing nuts 64 are threaded onto the respective threaded fasteners 63. It is to be understood that the enclosure 2 of the bicycle caddie 1 may be coupled to the bicycle 68 using any suitable alternative technique known to those skilled in the art.

In typical use, the bicycle caddie 1 is coupled to the bicycle 68 typically by inserting the hitch pin 39 on the hitch panel 38 in the hitch collar 62 on the towing frame 56. Various items (not shown), such as food, beverages, sunscreen and the like, can be placed in the enclosure interior 8 of the enclosure 2 by raising the table panel 27 from the enclosure opening 9. After placement of the items in the enclosure interior 8, the table panel 27 can be closed and selectively locked in place using the lock 31. The bicycle caddie 1 can be towed to a picnic site, tailgating event or the like as a cyclist (not shown) pedals the bicycle 68. The flag 22 can be deployed in the extended, functional position shown in FIG. 4 to enhance visibility of the bicycle caddie 1 during transit. The side reflector or reflectors 50 and/or the rear reflector or reflectors 51 further enhance visibility of the bicycle caddie 1, particularly at night.

At the picnic, tailgating or other site, the bicycle caddie 1 can be uncoupled from the bicycle 68. The table panel 27 can be pivoted from the enclosure opening 9 to expose the enclosure interior 8 and facilitate access to the items (not shown) in the enclosure interior 8. The bicycle caddie 1 can be transported on the wheels 12 and the swivel wheel 41 (FIG. 4) by grasping and extending the handle 16 from the enclosure 2 and/or using the hand grip 44. The fold-out table 26 can be selectively deployed in the extended, functional configuration shown in FIG. 5 to support food, beverages and the like during a picnic, for example. The carrying tray 46 can be selectively extended from the tray slot 47 to support various items. At the conclusion of the picnic or other event, the table panel 27 can be returned to the closed position of FIGS. 1 and 4 and the bicycle caddie 1 again coupled to the towing frame 56 on the bicycle 68 to facilitate towing of the bicycle caddie 1 behind the bicycle 68. The table leg 33 can be stored in the enclosure interior 8 of the enclosure 2 when not in use.

While the preferred embodiments of the invention have been described above, it will be recognized and understood that various modifications can be made in the invention and the appended claims are intended to cover all such modifications which may fall within the spirit and scope of the invention.

What is claimed is:

1. A bicycle caddie, comprising:
   a portable enclosure having an enclosure opening;
   a hitch bar carried by said enclosure;
   a fold-out table carried by said enclosure; said fold-out table comprises a table panel pivotally carried by said enclosure and positional between a closed position in said enclosure opening and an extended position;
   a hinge panel pivotally carried by said enclosure and wherein said table panel is pivotally carried by said hinge panel;
   a table leg adapted to detachably engage said table panel.

2. The bicycle caddie of claim 1 further comprising a lock carried by said table panel.

3. The bicycle caddie of claim 1 further comprising a handle telescopically extendable from said enclosure.

4. The bicycle caddie of claim 3 wherein said handle comprises a pair of handle shafts telescopically extendable from said enclosure and a handle bar spanning said handle shafts.

5. The bicycle caddie of claim 3 further comprising a hand grip carried by said enclosure.

6. A bicycle caddie for towing by a bicycle, comprising:
   a portable enclosure having an enclosure opening;
   a fold-out table carried by said enclosure; said fold-out table comprises a table panel pivotally carried by said enclosure and positional between a closed position in said enclosure opening and an extended position;
   a towing frame adapted for attachment to the bicycle;
   a hitch bar carried by said enclosure and adapted for coupling to said towing frame;
   comprising a hinge panel pivotally carried by said enclosure and wherein said table panel is pivotally carried by said hinge panel; and
   comprising a table leg adapted to detachably engage said table panel.

7. The bicycle caddie of claim 6 further comprising a lock carried by said table panel.

8. The bicycle caddie of claim 6 further comprising a handle telescopically extendable from said enclosure.

9. The bicycle caddie of claim 8 wherein said handle comprises a pair of handle shafts telescopically extendable from said enclosure and a handle bar spanning said handle shafts.

10. The bicycle caddie of claim 8 further comprising a hand grip carried by said enclosure.

11. A bicycle caddie for towing by a bicycle, comprising:
    a portable enclosure having an enclosure opening;
    a towing frame adapted for attachment to the bicycle, said towing frame having a frame shaft, a hitch collar carried by said frame shaft, a pair of frame arms extending from said frame shaft and a mount bracket carried by one of said pair of frame arms for attachment to the bicycle;
    a hitch bar carried by said enclosure and adapted for coupling to said towing frame; and
    comprising a fold-out table carried by said enclosure.

12. The bicycle caddie of claim 11 further comprising a fender carried by said pair of frame arms.

13. The bicycle caddie of claim 11 wherein said fold-out table comprises a hinge panel pivotally carried by said enclosure, a table panel pivotally carried by said hinge panel and a table leg detachably carried by said table panel, said table panel pivotal between a closed position wherein said table panel closes said enclosure opening and an extended position wherein said hinge panel and said table leg support said table panel.

* * * * *